(12) United States Patent
Thyagarajan et al.

(10) Patent No.: US 7,869,620 B2
(45) Date of Patent: Jan. 11, 2011

(54) METHODS FOR PROCESSING IMAGES TO DETECT OBJECTS BELOW THE SURFACE OF THE WATER

(76) Inventors: Kadayam S. Thyagarajan, 4782 Thurston Pl., San Diego, CA (US) 92130; Richard H. Patterson, 2237 Camino Contera, Vista, CA (US) 92075

( * ) Notice: Subject to any disclaimer, the term of this patent is extended or adjusted under 35 U.S.C. 154(b) by 810 days.

(21) Appl. No.: 11/895,394

(22) Filed: Aug. 23, 2007

(65) Prior Publication Data

US 2008/0049974 A1    Feb. 28, 2008

Related U.S. Application Data

(60) Provisional application No. 60/839,613, filed on Aug. 23, 2006.

(51) Int. Cl.
*G06K 9/00* (2006.01)
*H04N 9/47* (2006.01)

(52) U.S. Cl. .................................. 382/103; 348/81

(58) Field of Classification Search ................. 382/103, 382/107, 236; 348/81, 154, 155, 169, 170, 348/171, 172, 208.14, 208.16, 352
See application file for complete search history.

(56) References Cited

U.S. PATENT DOCUMENTS 5,243,541 A  *  9/1993  Ulich ........................... 348/81
7,474,334 B1 *  1/2009  Patterson ................ 348/207.99

* cited by examiner

*Primary Examiner*—Abolfazl Tabatabai
(74) *Attorney, Agent, or Firm*—David B. Waller

(57) ABSTRACT

The present invention is a processing method to increase the detection of objects below the surface of the water comprising the steps of: acquiring image data in separate spectral regions simultaneously and converting the image data into intensity value arrays for each spectral region, transforming the intensity value arrays into two-dimensional discrete wavelet transform arrays for each spectral region, and subtracting in a pair wise manner the two-dimensional discrete wavelet transform arrays thereby obtaining images showing an object below the surface of the water.

12 Claims, 12 Drawing Sheets

A

B

C

D

E

A

B

C

D

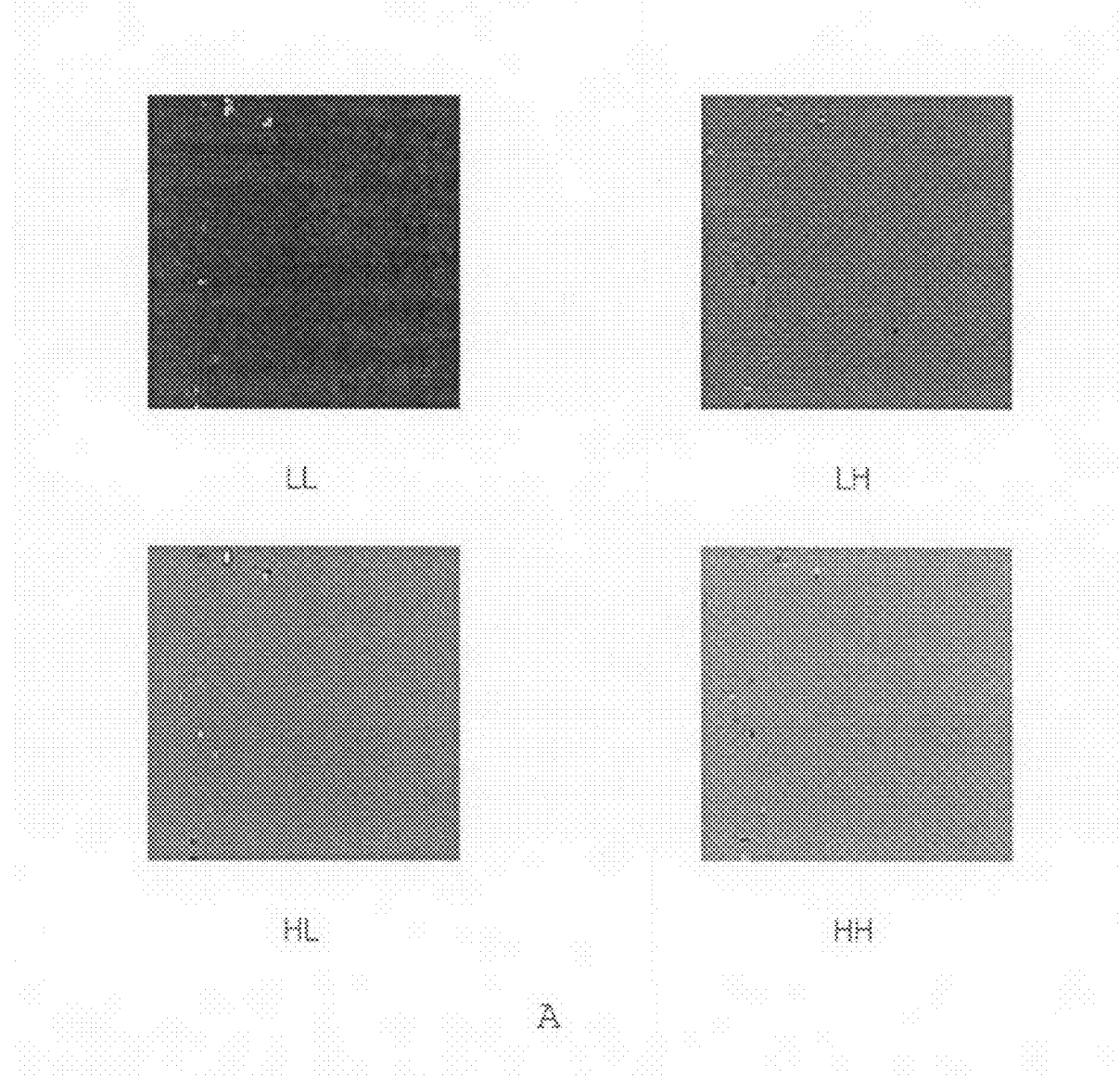

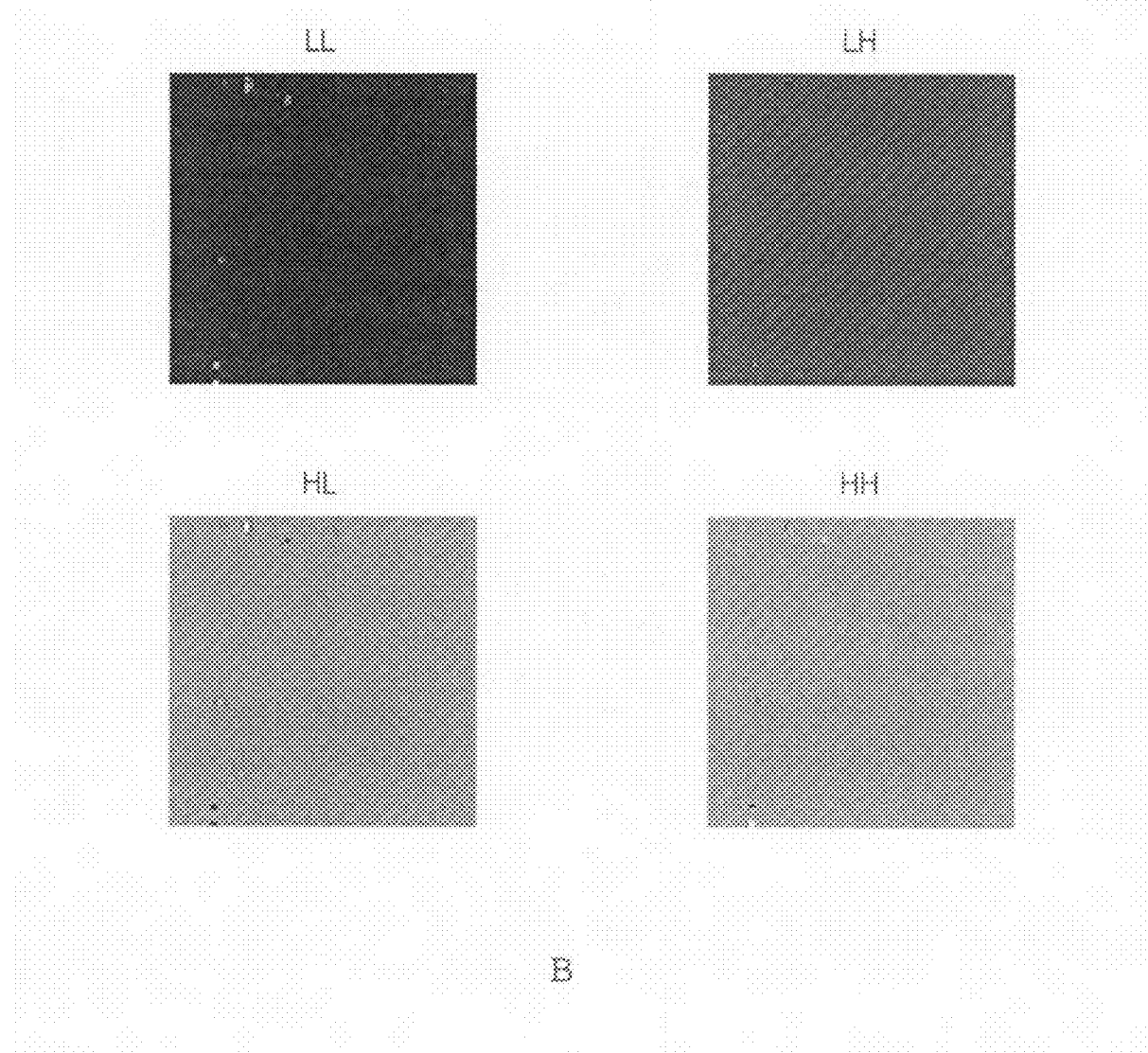

A

B

C

D

A

B

C

D

A

B

C

D

METHODS FOR PROCESSING IMAGES TO DETECT OBJECTS BELOW THE SURFACE OF THE WATER

CROSS-REFERENCE TO RELATED APPLICATIONS

This application is a continuation-in-part of provisional patent application Ser. No. 60/839,613 filed 23 Aug. 2006.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of Invention

This invention relates to methods for processing image data collected over a body of water to minimize or reduce noise and glints thereby increasing the detection of objects below the waters surface.

2. Description of Related Art

Images acquired through 3-chip cameras are processed in such a way as to enable target detection either with naked eye or with machine. The acquired raw images usually have a large amount of glints, sensor noise, and electronic circuit noise that make the detection difficult. Unfortunately without processing of these images to minimize the noise and glints objects below the waters surface cannot be clearly detected.

Consequently, there is a need in the imaging industry for method of processing data that allow increased detection of objects below the surface of the water.

BRIEF SUMMARY OF THE INVENTION

One aspect of the present invention is a processing method to increase the detection of objects below the surface of the water comprising the steps of:
  A. acquiring image data in separate spectral regions simultaneously and converting the image data into intensity value arrays for each spectral region,
  B. transforming the intensity value arrays into two-dimensional discrete wavelet transform arrays for each spectral region, and
  C. subtracting in a pair wise manner the two-dimensional discrete wavelet transform arrays thereby obtaining images showing an object below the surface of the water.

In another aspect of the present invention a methods is provided that is a processing method to increase the detection of objects below the surface of the water comprising the steps of:
  A. acquiring image data in separate spectral regions simultaneously and converting the image data into intensity value arrays for each spectral region,
  B. transforming the intensity value arrays into two-dimensional discrete wavelet transform arrays for each spectral region,
  C. removing or reducing glints and electronic noise from the two-dimensional discrete wavelet transform arrays for each spectral region to produce a first modified array data set for each spectral region, and
  D. subtracting in a pair wise manner first modified array data sets thereby obtaining images showing an object below the surface of the water.

In still another aspect of the present invention a methods is provided that is a processing method to increase the detection of objects below the surface of the water comprising the steps of:
  A. acquiring image data in separate spectral regions simultaneously and converting the image data into intensity value arrays for each spectral region,
  B. transforming the intensity value arrays into two-dimensional discrete wavelet transform arrays for each spectral region,
  C. eliminating or reducing surface reflection from the two-dimensional discrete wavelet transform arrays to produce a second modified array data set for each spectral region, and
  D. subtracting in a pair wise manner second modified array data sets thereby obtaining images showing an object below the surface of the water.

In yet another aspect of the present invention a methods is provided that is a processing method to increase the detection of objects below the surface of the water comprising the steps of:
  A. acquiring image data in separate spectral regions simultaneously and converting the image data into intensity value arrays for each spectral region,
  B. transforming the intensity value arrays into two-dimensional discrete wavelet transform arrays for each spectral region,
  C. removing or reducing glints and electronic noise from the two-dimensional discrete wavelet transform arrays for each spectral region to produce a first modified array data set for each spectral region,
  D. eliminating or reducing surface reflection from first modified array data set to produce a second modified array data set for each spectral region, and
  E. subtracting in a pair wise manner second modified array data sets thereby obtaining images showing an object below the surface of the water.

In another embodiment the processing method may further comprise applying post-processing to enhance the subtracted image components or applying detection algorithm to the post-processed image components.

DETAILED DESCRIPTION OF THE INVENTION

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail.

Figure 1:
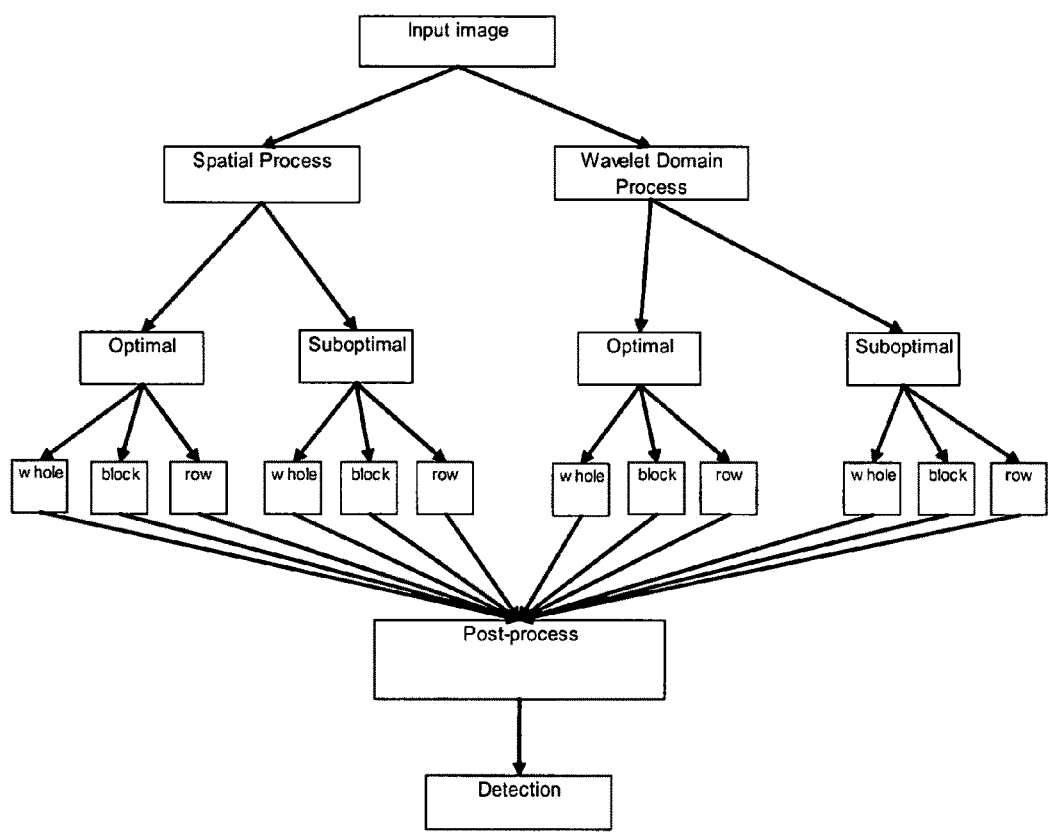
FIG. 1 (A) is a block diagram of processing methods of the present invention; (B) is a block diagram of spatial processing methods; (C) is a block diagram of wavelet domain processing methods; (D) is a block diagram of optimal processing methods; and (E) is a block diagram of sub-optimal processing methods.
Figure 1:
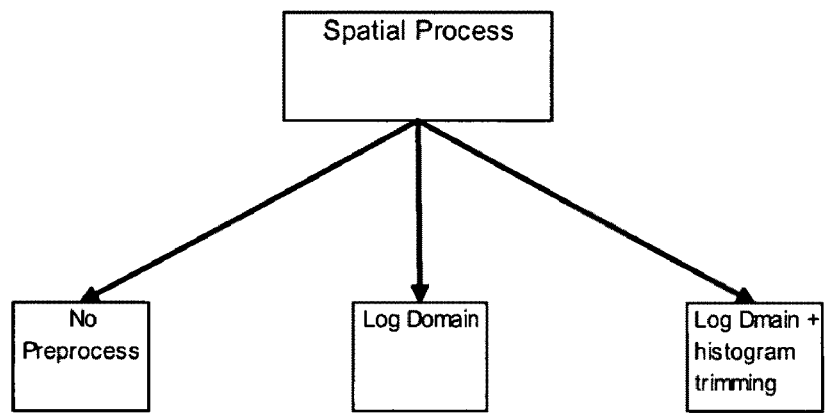
Figure 1:
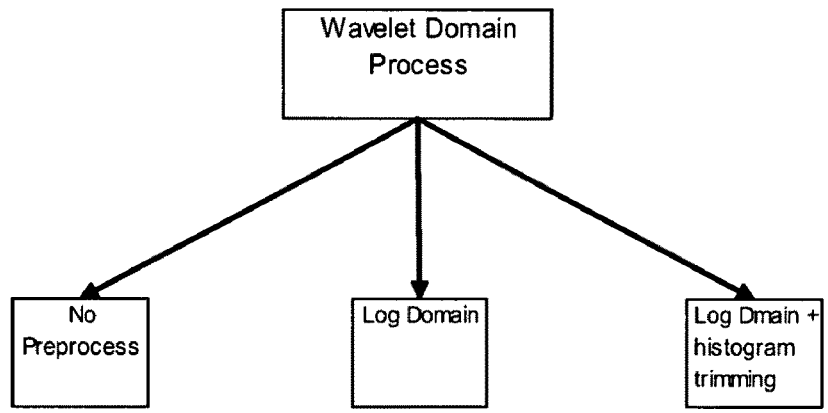
Figure 1:
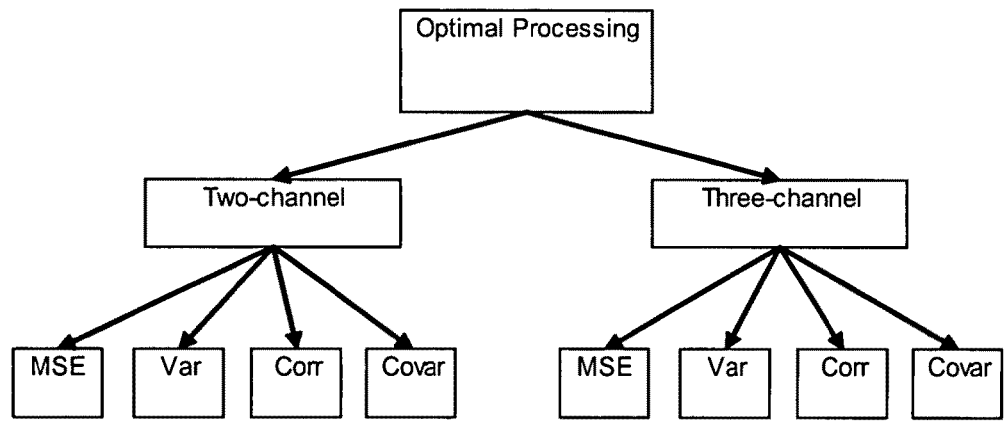
Figure 1:
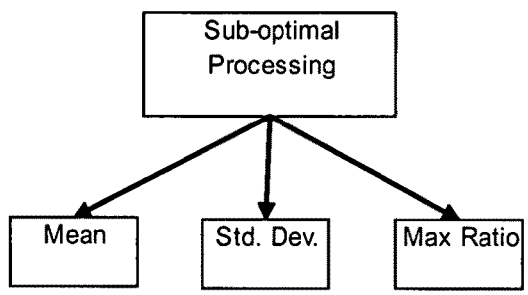

The present invention is a processing method used for the detection of targets below the surface of the water using color images. These processing methods work with either two or three component images. In either case, the processing methods can be classified as optimal or suboptimal. Optimal processing methods use the statistics of the component images while the suboptimal ones use ad hoc parameters. FIG. 1 shows the classification of the various pre-detection processing methods described below. These processing methods could be performed in the spatial domain, frequency domain or the time and spatial domain.

In optimal processing, the camera sensors produce intensity images with differing intensity values in the red, green, and blue spectral regions depending on the reflective properties of the waters surface, water column, and target. The main idea behind target detection, therefore, is to subtract one component image from another so that the difference image retains only the target since the light penetrates water with differing diffusion depth at the three spectral regions. Preferably the signal from the surface reflection has been completely removed. It should be pointed out that the contrast due to the target between the component images is very small and depends on the penetration depth of light in the spectral regions. Thus, the process methods discriminate a very small contrast from image components. The ability to detect such a miniscule contrast depends on 1) the sensor dynamic range, 2) effectiveness of the preprocessing methods in eliminating glint and surface reflections, and 3) detection algorithm itself. Our processing methods address the third element primarily because the first is a limitation of the sensor and the second can be eliminated with standard methods known to those skilled in the art.

The processing methods of the present invention may be applied to two channel and three channel imaging. The processing methods for two channel imaging may be used to minimize the mean square error, error variance, correlation and/or covariance. To minimize the mean square error a scaled image component is subtracted from another to enhance the low contrast of the target. Consider the red and green channels. Let R(m,n) and G(m,n) be the red and green channel pixels at location(m,n). Then, define the difference pixel $e_R(m,n)$ at the same pixel location as $$e_R(m,n) = R(m,n) - \alpha_R G(m,n) \quad \text{Equation 1}$$

We want to determine the scale factor $\alpha_R$ so as to minimize the mean square error $$\varepsilon_R = \frac{1}{MN} \sum_{m=0}^{M-1} \sum_{n=0}^{N-1} e_R^2(m,n).$$

The optimal coefficient $\alpha^*_R$ is obtained by setting the derivative of $\epsilon_R$ with respect to $\alpha_R$, to zero. This results in the optimal coefficient value as given by $$\alpha^*_R = \frac{\sum_{m=0}^{M-1} \sum_{n=0}^{N-1} R(m,n) G(m,n)}{\sum_{m=0}^{M-1} \sum_{n=0}^{N-1} G^2(m,n)} \quad \text{Equation 2}$$

Note that both the numerator and denominator have the same normalizing factor 1/MN and can, therefore, be omitted. The numerator of Equation 2 is a measure of the correlation between the red and green channels.

In a similar manner we can obtain the optimal scaling coefficients for the green-blue and blue-red channels and are given, respectively, by $$\alpha^*_G = \frac{\sum_{m=0}^{M-1} \sum_{n=0}^{N-1} G(m,n) B(m,n)}{\sum_{m=0}^{M-1} \sum_{n=0}^{N-1} B^2(m,n)}, \quad \text{Equation 3}$$

$$\alpha^*_B = \frac{\sum_{m=0}^{M-1} \sum_{n=0}^{N-1} B(m,n) R(m,n)}{\sum_{m=0}^{M-1} \sum_{n=0}^{N-1} R^2(m,n)}$$

Minimization of the error variance $\epsilon_R$ instead of minimizing the mean square error, is given by $$\varepsilon_R = \frac{1}{MN} \sum_{m=0}^{M-1} \sum_{n=0}^{N-1} (e_R(m,n) - \mu_{eR})^2 \quad \text{Equation 4}$$

$$= \frac{1}{MN} \sum_{m=0}^{M-1} \sum_{n=0}^{N-1} ((R(m,n) - \mu_R) - \alpha_R(G(m,n) - \mu_G))^2$$

where $\mu_R$ is given by $$\mu_{eR} = \frac{1}{MN} \sum_{m=0}^{M-1} \sum_{n=0}^{N-1} R(m,n) - \frac{\alpha_R}{MN} \sum_{m=0}^{M-1} \sum_{n=0}^{N-1} G(m,n) \quad \text{Equation 5}$$

This results in the optimal coefficient, which is expressed as:

$$\alpha_R^* = \frac{\sum_{m=0}^{M-1}\sum_{n=0}^{N-1}(R(m,n)-\mu_R)(G(m,n)-\mu_G)}{\sum_{m=0}^{M-1}\sum_{n=0}^{N-1}(G(m,n)-\mu_G)^2} \quad \text{Equation 6}$$

The numerator of Equation 6 is a measure of the covariance rather than correlation and the denominator is the variance rather than sum of squares. Following the same argument for the red-green channel, we obtain the optimal coefficients for the green-blue and blue-red channels as:

$$\alpha_G^* = \frac{\sum_{m=0}^{M-1}\sum_{n=0}^{N-1}(G(m,n)-\mu_G)(B(m,n)-\mu_B)}{\sum_{m=0}^{M-1}\sum_{n=0}^{N-1}(G(m,n)-\mu_G)^2} \quad \text{Equation 7}$$

$$\alpha_B^* = \frac{\sum_{m=0}^{M-1}\sum_{n=0}^{N-1}(B(m,n)-\mu_B)(R(m,n)-\mu_R)}{\sum_{m=0}^{M-1}\sum_{n=0}^{N-1}(R(m,n)-\mu_R)^2}$$

While the above procedures determine the optimal coefficients by minimizing the mean square error or the error variance, there exists an alternative minimization criterion to compute the optimal weights. This is the minimum correlation between the difference channels. Consider the two error images corresponding to the red and green channels, as given by $$e_R(m,n)=R(m,n)-\alpha_{R1}G(m,n),\; e_G(m,n)=G(m,n)-\alpha_{G1}B(m,n) \quad \text{Equation 8}$$

Determination of the two coefficients, $\alpha_{R1}$ and $\alpha_{G1}$, by minimizing the cross correlation is expressed as $$\varepsilon_{RG} = \frac{1}{MN}\sum_{m=0}^{M-1}\sum_{n=0}^{N-1}e_R(m,n)e_G(m,n) \quad \text{Equation 9}$$
$$\frac{1}{MN}\sum_{m=0}^{M-1}\sum_{n=0}^{N-1}(R(m,n)-\alpha_{R1}G(m,n))$$
$$G(m,n)-\alpha_{G1}B(m,n))$$

Using the standard procedure for the minimization, the following normal equations are obtained:

$$\alpha_{G1}^*\sum_{m=0}^{M-1}\sum_{n=0}^{N-1}G(m,n)B(m,n)-\sum_{m=0}^{M-1}\sum_{n=0}^{N-1}G^2(m,n)=0 \quad \text{Equation 10}$$

$$\alpha_{R1}^*\sum_{m=0}^{M-1}\sum_{n=0}^{N-1}G(m,n)B(m,n)-\sum_{m=0}^{M-1}\sum_{n=0}^{N-1}B(m,n)R(m,n)=0 \quad \text{Equation 11}$$

$$\alpha_{B1}^*\sum_{m=0}^{M-1}\sum_{n=0}^{N-1}B(m,n)R(m,n)-\sum_{m=0}^{M-1}\sum_{n=0}^{N-1}B^2(m,n)=0 \quad \text{Equation 12}$$

-continued $$\alpha_{G1}^*\sum_{m=0}^{M-1}\sum_{n=0}^{N-1}B(m,n)R(m,n)-\sum_{m=0}^{M-1}\sum_{n=0}^{N-1}R(m,n)G(m,n)=0 \quad \text{Equation 13}$$

$$\alpha_{R1}^*\sum_{m=0}^{M-1}\sum_{n=0}^{N-1}R(m,n)G(m,n)-\sum_{m=0}^{M-1}\sum_{n=0}^{N-1}R^2(m,n)=0 \quad \text{Equation 14}$$

$$\alpha_{B1}^*\sum_{m=0}^{M-1}\sum_{n=0}^{N-1}R(m,n)G(m,n)-\sum_{m=0}^{M-1}\sum_{n=0}^{N-1}G(m,n)B(m,n)=0 \quad \text{Equation 15}$$

Since Equation 11 and Equation 14 are distinct as are the other equations, by adding them $\alpha^*_{R1}$ can be resolved by $$\alpha_{R1}^* = \frac{\sum_{m=0}^{M-1}\sum_{n=0}^{N-1}R^2(m,n)+\sum_{m=0}^{M-1}\sum_{n=0}^{N-1}B(m,n)R(m,n)}{\sum_{m=0}^{M-1}\sum_{n=0}^{N-1}R(m,n)G(m,n)+\sum_{m=0}^{M-1}\sum_{n=0}^{N-1}G(m,n)B(m,n)} \quad \text{Equation 16}$$

In a like manner, the optimal coefficients for the green and blue channels are given by:

$$\alpha_{G1}^* = \frac{\sum_{m=0}^{M-1}\sum_{n=0}^{N-1}G^2(m,n)+\sum_{m=0}^{M-1}\sum_{n=0}^{N-1}R(m,n)G(m,n)}{\sum_{m=0}^{M-1}\sum_{n=0}^{N-1}G(m,n)B(m,n)+\sum_{m=0}^{M-1}\sum_{n=0}^{N-1}B(m,n)R(m,n)}, \quad \text{Equation 17}$$

$$\alpha_{B1}^* = \frac{\sum_{m=0}^{M-1}\sum_{n=0}^{N-1}B^2(m,n)+\sum_{m=0}^{M-1}\sum_{n=0}^{N-1}G(m,n)B(m,n)}{\sum_{m=0}^{M-1}\sum_{n=0}^{N-1}B(m,n)R(m,n)+\sum_{m=0}^{M-1}\sum_{n=0}^{N-1}R(m,n)G(m,n)}, \quad \text{Equation 18}$$

These are listed in Table 1.

By minimizing the covariance instead of the correlation between the channels, we obtain another set of optimal coefficients. These are identical in form to the coefficients in Equation 11 and Equation 14 except that each variable is replaced by its mean-removed value. These are listed in the Table 1.

The processing methods for three channel imaging may also be used to minimize the mean square error, error variance, correlation and/or covariance. In the three-channel imaging, all the three channels are considered to generate the difference image. Consequently, Equation 1 is rewritten as:

$$e_R(m,n)=R(m,n)-\alpha_R G(m,n)-\beta_R B(m,n) \quad \text{Equation 19}$$

Similarly, the other two difference channels are given by $$e_G(m,n)=G(m,n)-\alpha_G B(m,n)-\beta_G R(m,n) \quad \text{Equation 20}$$

$$e_B(m,n)=B(m,n)-\alpha_B R(m,n)-\beta_B G(m,n) \quad \text{Equation 21}$$

Similar to the two-channel case, the minimization of the mean square error gives us the normal equations for the optimal coefficients:

$$\begin{bmatrix} \sum_{m=0}^{M-1}\sum_{n=0}^{N-1} G^2(m,n) & \sum_{m=0}^{M-1}\sum_{n=0}^{N-1} G(m,n)B(m,n) \\ \sum_{m=0}^{M-1}\sum_{n=0}^{N-1} G(m,n)B(m,n) & \sum_{m=0}^{M-1}\sum_{n=0}^{N-1} B^2(m,n) \end{bmatrix} \begin{bmatrix} \alpha_R^* \\ \beta_R^* \end{bmatrix} = \begin{bmatrix} \sum_{m=0}^{M-1}\sum_{n=0}^{N-1} R(m,n)G(m,n) \\ \sum_{m=0}^{M-1}\sum_{n=0}^{N-1} B(m,n)R(m,n) \end{bmatrix}$$

Equation 22

$$\begin{bmatrix} \sum_{m=0}^{M-1}\sum_{n=0}^{N-1} B^2(m,n) & \sum_{m=0}^{M-1}\sum_{n=0}^{N-1} B(m,n)R(m,n) \\ \sum_{m=0}^{M-1}\sum_{n=0}^{N-1} B(m,n)R(m,n) & \sum_{m=0}^{M-1}\sum_{n=0}^{N-1} R^2(m,n) \end{bmatrix} \begin{bmatrix} \alpha_G^* \\ \beta_G^* \end{bmatrix} = \begin{bmatrix} \sum_{m=0}^{M-1}\sum_{n=0}^{N-1} G(m,n)B(m,n) \\ \sum_{m=0}^{M-1}\sum_{n=0}^{N-1} R(m,n)G(m,n) \end{bmatrix}$$

Equation 23

$$\begin{bmatrix} \sum_{m=0}^{M-1}\sum_{n=0}^{N-1} R^2(m,n) & \sum_{m=0}^{M-1}\sum_{n=0}^{N-1} R(m,n)G(m,n) \\ \sum_{m=0}^{M-1}\sum_{n=0}^{N-1} R(m,n)G(m,n) & \sum_{m=0}^{M-1}\sum_{n=0}^{N-1} G^2(m,n) \end{bmatrix} \begin{bmatrix} \alpha_B^* \\ \beta_B^* \end{bmatrix} = \begin{bmatrix} \sum_{m=0}^{M-1}\sum_{n=0}^{N-1} B(m,n)R(m,n) \\ \sum_{m=0}^{M-1}\sum_{n=0}^{N-1} G(m,n)B(m,n) \end{bmatrix}$$

Equation 24

The optimal coefficients will be identical to those in Equation 22 through Equation 24, for the three-channel case, that yield the minimum error variance except that each term must be replaced by its mean removed value. These are listed in Table 2.

The difference channels are as defined in Equation 19 to Equation 21. Minimization of the pair-wise correlations is as follows.

$$\varepsilon_R = \frac{1}{MN}\sum_{m=0}^{M-1}\sum_{n=0}^{N-1} e_R(m,n)e_G(m,n)$$

$$\varepsilon_G = \frac{1}{MN}\sum_{m=0}^{M-1}\sum_{n=0}^{N-1} e_G(m,n)e_B(m,n)$$

$$\varepsilon_B = \frac{1}{MN}\sum_{m=0}^{M-1}\sum_{n=0}^{N-1} e_B(m,n)e_R(m,n)$$

Equation 25

By setting the derivatives of the three terms in Equation 25 with respect to the three coefficients the following equations are obtained.

$$\alpha_G \sum_{m=0}^{M-1}\sum_{n=0}^{N-1} G(m,n)B(m,n) + \beta_G \sum_{m=0}^{M-1}\sum_{n=0}^{N-1} R(m,n)G(m,n) = \sum_{m=0}^{M-1}\sum_{n=0}^{N-1} G^2(m,n)$$

Equation 26

$$\alpha_R \sum_{m=0}^{M-1}\sum_{n=0}^{N-1} G(m,n)B(m,n) + \beta_R \sum_{m=0}^{M-1}\sum_{n=0}^{N-1} B^2(m,n) = \sum_{m=0}^{M-1}\sum_{n=0}^{N-1} B(m,n)R(m,n)$$

Equation 27

$$\alpha_G \sum_{m=0}^{M-1}\sum_{n=0}^{N-1} B^2(m,n) + \beta_G \sum_{m=0}^{M-1}\sum_{n=0}^{N-1} B(m,n)R(m,n) = \sum_{m=0}^{M-1}\sum_{n=0}^{N-1} G(m,n)B(m,n)$$

Equation 28

$$\alpha_R \sum_{m=0}^{M-1}\sum_{n=0}^{N-1} R(m,n)G(m,n) + \beta_R \sum_{m=0}^{M-1}\sum_{n=0}^{N-1} B(m,n)R(m,n) = \sum_{m=0}^{M-1}\sum_{n=0}^{N-1} R^2(m,n)$$

Equation 29

$$\alpha_B \sum_{m=0}^{M-1}\sum_{n=0}^{N-1} B(m,n)R(m,n) + \beta_B \sum_{m=0}^{M-1}\sum_{n=0}^{N-1} G(m,n)B(m,n) = \sum_{m=0}^{M-1}\sum_{n=0}^{N-1} B^2(m,n)$$

Equation 30

$$\alpha_G \sum_{m=0}^{M-1}\sum_{n=0}^{N-1} B(m,n)R(m,n) + \beta_G \sum_{m=0}^{M-1}\sum_{n=0}^{N-1} R^2(m,n) = \sum_{m=0}^{M-1}\sum_{n=0}^{N-1} R(m,n)G(m,n)$$

Equation 31

$$\alpha_B \sum_{m=0}^{M-1}\sum_{n=0}^{N-1} R^2(m,n) + \beta_B \sum_{m=0}^{M-1}\sum_{n=0}^{N-1} R(m,n)G(m,n) = \sum_{m=0}^{M-1}\sum_{n=0}^{N-1} B(m,n)R(m,n)$$

Equation 32

$$\alpha_G \sum_{m=0}^{M-1}\sum_{n=0}^{N-1} G(m,n)B(m,n) + \beta_G \sum_{m=0}^{M-1}\sum_{n=0}^{N-1} R(m,n)G(m,n) = \sum_{m=0}^{M-1}\sum_{n=0}^{N-1} G^2(m,n)$$

Equation 33

$$\alpha_R \sum_{m=0}^{M-1}\sum_{n=0}^{N-1} R(m,n)G(m,n) + \beta_R \sum_{m=0}^{M-1}\sum_{n=0}^{N-1} B(m,n)R(m,n) = \sum_{m=0}^{M-1}\sum_{n=0}^{N-1} R^2(m,n)$$

Equation 34

$$\alpha_B \sum_{m=0}^{M-1}\sum_{n=0}^{N-1} R(m,n)G(m,n) + \beta_B \sum_{m=0}^{M-1}\sum_{n=0}^{N-1} G^2(m,n) = \sum_{m=0}^{M-1}\sum_{n=0}^{N-1} G(m,n)B(m,n)$$

Equation 35

-continued $$\alpha_R \sum_{m=0}^{M-1}\sum_{n=0}^{N-1} G^2(m,n) + \beta_R \sum_{m=0}^{M-1}\sum_{n=0}^{N-1} G(m,n)B(m,n) = \sum_{m=0}^{M-1}\sum_{n=0}^{N-1} R(m,n)G(m,n)$$

Equation 36

$$\alpha_B \sum_{m=0}^{M-1}\sum_{n=0}^{N-1} B(m,n)R(m,n) + \beta_B \sum_{m=0}^{M-1}\sum_{n=0}^{N-1} G(m,n)B(m,n) = \sum_{m=0}^{M-1}\sum_{n=0}^{N-1} B^2(m,n)$$

Equation 37

Since equations (29) and (34) are identical we retain one of them. Equations (27) and (36) involve the same set of variables but are distinct. Therefore, we form a new equation by subtracting (27) from (36) to get $$\alpha_R \sum_{m=0}^{M-1}\sum_{n=0}^{N-1}[G^2(m,n) - G(m,n)B(m,n)] + \beta_R \sum_{m=0}^{M-1}\sum_{n=0}^{N-1}[G(m,n)B(m,n) - B^2(m,n)] = \sum_{m=0}^{M-1}\sum_{n=0}^{N-1}[R(m,n)G(m,n) - B(m,n)R(m,n)]$$

Equation 38

Now equations (29) and (38) can be consolidated as:

$$\begin{bmatrix} \sum_{m=0}^{M-1}\sum_{n=0}^{N-1} RG & \sum_{m=0}^{M-1}\sum_{n=0}^{N-1} BR \\ \sum_{m=0}^{M-1}\sum_{n=0}^{N-1}[G^2 - GB] & \sum_{m=0}^{M-1}\sum_{n=0}^{N-1}[GB - B^2] \end{bmatrix} \begin{bmatrix} \alpha_R \\ \beta_R \end{bmatrix} = \begin{bmatrix} \sum_{m=0}^{M-1}\sum_{n=0}^{N-1} R^2 \\ \sum_{m=0}^{M-1}\sum_{n=0}^{N-1}[RG - BR] \end{bmatrix}$$

Equation 39

In Equation (39), the double subscripts are omitted for want of space. In a similar manner, we arrive at the rest of the equations:

$$\begin{bmatrix} \sum_{m=0}^{M-1}\sum_{n=0}^{N-1} GB & \sum_{m=0}^{M-1}\sum_{n=0}^{N-1} RG \\ \sum_{m=0}^{M-1}\sum_{n=0}^{N-1}[B^2 - BR] & \sum_{m=0}^{M-1}\sum_{n=0}^{N-1}[BR - R^2] \end{bmatrix} \begin{bmatrix} \alpha_G \\ \beta_G \end{bmatrix} = \begin{bmatrix} \sum_{m=0}^{M-1}\sum_{n=0}^{N-1} G^2 \\ \sum_{m=0}^{M-1}\sum_{n=0}^{N-1}[GB - RG] \end{bmatrix}$$

Equation 40

$$\begin{bmatrix} \sum_{m=0}^{M-1}\sum_{n=0}^{N-1} BR & \sum_{m=0}^{M-1}\sum_{n=0}^{N-1} GB \\ \sum_{m=0}^{M-1}\sum_{n=0}^{N-1}[R^2 - RG] & \sum_{m=0}^{M-1}\sum_{n=0}^{N-1}[RG - G^2] \end{bmatrix} \begin{bmatrix} \alpha_B \\ \beta_B \end{bmatrix} = \begin{bmatrix} \sum_{m=0}^{M-1}\sum_{n=0}^{N-1} B^2 \\ \sum_{m=0}^{M-1}\sum_{n=0}^{N-1}[BR - GB] \end{bmatrix}$$

Equation 41

The optimal coefficients for the three-channel minimum correlation case are obtained by solving the normal equations (39) through (41).

For the minimum covariance case the optimal coefficients will be identical to those corresponding to the minimum correlation case, except that each entry in the Equation 39 through Equation 41 must be replaced by its mean-removed value. These are listed in Table 2.

TABLE 1

Optimal Coefficients: Two-channel case

| Case | Optimal Coefficients | Minimum MSE or Variance Value |
|---|---|---|
| Minimum MSE | $\alpha_R^* = \dfrac{\sum_{m=0}^{M-1}\sum_{n=0}^{N-1} R(m,n)G(m,n)}{\sum_{m=0}^{M-1}\sum_{n=0}^{N-1} G^2(m,n)}$ | $\sum_{m=0}^{M-1}\sum_{n=0}^{N-1} R^2(m,n) - \dfrac{\left\{\sum_{m=0}^{M-1}\sum_{n=0}^{N-1} R(m,n)G(m,n)\right\}^2}{\sum_{m=0}^{M-1}\sum_{n=0}^{N-1} G^2(m,n)}$ |
| | $\alpha_G^* = \dfrac{\sum_{m=0}^{M-1}\sum_{n=0}^{N-1} G(m,n)B(m,n)}{\sum_{m=0}^{M-1}\sum_{n=0}^{N-1} B^2(m,n)}$ | $\sum_{m=0}^{M-1}\sum_{n=0}^{N-1} G^2(m,n) - \dfrac{\left\{\sum_{m=0}^{M-1}\sum_{n=0}^{N-1} G(m,n)B(m,n)\right\}^2}{\sum_{m=0}^{M-1}\sum_{n=0}^{N-1} B^2(m,n)}$ |

TABLE 1-continued

| Case | | | |
|---|---|---|---|
| | $\alpha_B^* = \dfrac{\sum_{m=0}^{M-1}\sum_{n=0}^{N-1} B(m,n)R(m,n)}{\sum_{m=0}^{M-1}\sum_{n=0}^{N-1} R^2(m,n)}$ | $\sum_{m=0}^{M-1}\sum_{n=0}^{N-1} B^2(m,n) - \dfrac{\left\{\sum_{m=0}^{M-1}\sum_{n=0}^{N-1} B(m,n)R(m,n)\right\}^2}{\sum_{m=0}^{M-1}\sum_{n=0}^{N-1} R^2(m,n)}$ | |
| Minimum Variance | $\alpha_R^* = \dfrac{\sum_{m=0}^{M-1}\sum_{n=0}^{N-1} \tilde{R}(m,n)\tilde{G}(m,n)}{\sum_{m=0}^{M-1}\sum_{n=0}^{N-1} \tilde{G}^2(m,n)}$ | $\sigma_R^2 - \dfrac{\left\{\sum_{m=0}^{M-1}\sum_{n=0}^{N-1} \tilde{R}(m,n)\tilde{G}(m,n)\right\}^2}{\sigma_G^2}$ | |
| | $\alpha_G^* = \dfrac{\sum_{m=0}^{M-1}\sum_{n=0}^{N-1} \tilde{G}(m,n)\tilde{B}(m,n)}{\sum_{m=0}^{M-1}\sum_{n=0}^{N-1} \tilde{B}^2(m,n)}$ | $\sigma_G^2 - \dfrac{\left\{\sum_{m=0}^{M-1}\sum_{n=0}^{N-1} \tilde{G}(m,n)\tilde{B}(m,n)\right\}^2}{\sigma_B^2}$ | |
| | $\sigma_G^2 - \dfrac{\sum_{m=0}^{M-1}\sum_{n=0}^{N-1} \tilde{G}(m,n)\tilde{B}(m,n)}{\sum_{m=0}^{M-1}\sum_{n=0}^{N-1} \tilde{B}^2(m,n)}$ | $\sigma_B^2 - \dfrac{\left\{\sum_{m=0}^{M-1}\sum_{n=0}^{N-1} \tilde{B}(m,n)\tilde{R}(m,n)\right\}^2}{\sigma_R^2}$ | |

$\tilde{R}(m,n) = R(m,n) - \mu_R,$
$\tilde{G}(m,n) = R(m,n) - \mu_G$
$\tilde{B}(m,n) = R(m,n) - \mu_B$

| Case | Optimal Coefficients: 1$^{st}$ set | Remark |
|---|---|---|
| Minimum Correlation | $\alpha_R^* = \dfrac{\sum_{m=0}^{M-1}\sum_{n=0}^{N-1} R^2(m,n) + \sum_{m=0}^{M-1}\sum_{n=0}^{N-1} B(m,n)R(m,n)}{\sum_{m=0}^{M-1}\sum_{n=0}^{N-1} R(m,n)G(m,n) + \sum_{m=0}^{M-1}\sum_{n=0}^{N-1} G(m,n)B(m,n)}$ | |
| | $\alpha_G^* = \dfrac{\sum_{m=0}^{M-1}\sum_{n=0}^{N-1} G^2(m,n) + \sum_{m=0}^{M-1}\sum_{n=0}^{N-1} R(m,n)G(m,n)}{\sum_{m=0}^{M-1}\sum_{n=0}^{N-1} G(m,n)B(m,n) + \sum_{m=0}^{M-1}\sum_{n=0}^{N-1} B(m,n)R(m,n)}$ | |
| | $\alpha_B^* = \dfrac{\sum_{m=0}^{M-1}\sum_{n=0}^{N-1} B^2(m,n) + \sum_{m=0}^{M-1}\sum_{n=0}^{N-1} G(m,n)B(m,n)}{\sum_{m=0}^{M-1}\sum_{n=0}^{N-1} B(m,n)R(m,n) + \sum_{m=0}^{M-1}\sum_{n=0}^{N-1} R(m,n)G(m,n)}$ | |
| Minimum Covariance | $\alpha_R^* = \dfrac{\sum_{m=0}^{M-1}\sum_{n=0}^{N-1} \tilde{R}^2(m,n) + \sum_{m=0}^{M-1}\sum_{n=0}^{N-1} \tilde{B}(m,n)\tilde{R}(m,n)}{\sum_{m=0}^{M-1}\sum_{n=0}^{N-1} \tilde{R}(m,n)\tilde{G}(m,n) + \sum_{m=0}^{M-1}\sum_{n=0}^{N-1} \tilde{G}(m,n)\tilde{B}(m,n)}$ | $\tilde{R}(m,n) = R(m,n) - \mu_R$<br>$\tilde{G}(m,n) = G(m,n) - \mu_G$<br>$\tilde{B}(m,n) = B(m,n) - \mu_B$ |
| | $\alpha_G^* = \dfrac{\sum_{m=0}^{M-1}\sum_{n=0}^{N-1} \tilde{G}^2(m,n) + \sum_{m=0}^{M-1}\sum_{n=0}^{N-1} \tilde{R}(m,n)\tilde{G}(m,n)}{\sum_{m=0}^{M-1}\sum_{n=0}^{N-1} \tilde{G}(m,n)\tilde{B}(m,n) + \sum_{m=0}^{M-1}\sum_{n=0}^{N-1} \tilde{B}(m,n)\tilde{R}(m,n)}$ | |
| | $\alpha_B^* = \dfrac{\sum_{m=0}^{M-1}\sum_{n=0}^{N-1} \tilde{B}^2(m,n) + \sum_{m=0}^{M-1}\sum_{n=0}^{N-1} \tilde{G}(m,n)\tilde{B}(m,n)}{\sum_{m=0}^{M-1}\sum_{n=0}^{N-1} \tilde{B}(m,n)\tilde{R}(m,n) + \sum_{m=0}^{M-1}\sum_{n=0}^{N-1} \tilde{R}(m,n)\tilde{G}(m,n)}$ | |

TABLE 2

Optimal Coefficients: Three-channel case

| Case | Optimal Coefficients |
|---|---|
| Minimum MSE | $\begin{bmatrix} \sum_{m=0}^{M-1}\sum_{n=0}^{N-1} G^2(m,n) & \sum_{m=0}^{M-1}\sum_{n=0}^{N-1} G(m,n)B(m,n) \\ \sum_{m=0}^{M-1}\sum_{n=0}^{N-1} G(m,n)B(m,n) & \sum_{m=0}^{M-1}\sum_{n=0}^{N-1} B^2(m,n) \end{bmatrix} \begin{bmatrix} \alpha_R \\ \beta_R \end{bmatrix} = \begin{bmatrix} \sum_{m=0}^{M-1}\sum_{n=0}^{N-1} R(m,n)G(m,n) \\ \sum_{m=0}^{M-1}\sum_{n=0}^{N-1} B(m,n)R(m,n) \end{bmatrix}$ |
| | $\begin{bmatrix} \sum_{m=0}^{M-1}\sum_{n=0}^{N-1} B^2(m,n) & \sum_{m=0}^{M-1}\sum_{n=0}^{N-1} B(m,n)R(m,n) \\ \sum_{m=0}^{M-1}\sum_{n=0}^{N-1} B(m,n)R(m,n) & \sum_{m=0}^{M-1}\sum_{n=0}^{N-1} R^2(m,n) \end{bmatrix} \begin{bmatrix} \alpha_G \\ \beta_G \end{bmatrix} = \begin{bmatrix} \sum_{m=0}^{M-1}\sum_{n=0}^{N-1} G(m,n)B(m,n) \\ \sum_{m=0}^{M-1}\sum_{n=0}^{N-1} R(m,n)G(m,n) \end{bmatrix}$ |
| | $\begin{bmatrix} \sum_{m=0}^{M-1}\sum_{n=0}^{N-1} R^2(m,n) & \sum_{m=0}^{M-1}\sum_{n=0}^{N-1} R(m,n)G(m,n) \\ \sum_{m=0}^{M-1}\sum_{n=0}^{N-1} R(m,n)G(m,n) & \sum_{m=0}^{M-1}\sum_{n=0}^{N-1} G^2(m,n) \end{bmatrix} \begin{bmatrix} \alpha_B \\ \beta_B \end{bmatrix} = \begin{bmatrix} \sum_{m=0}^{M-1}\sum_{n=0}^{N-1} B(m,n)R(m,n) \\ \sum_{m=0}^{M-1}\sum_{n=0}^{N-1} G(m,n)B(m,n) \end{bmatrix}$ |
| Minimum Variance | $\begin{bmatrix} \sum_{m=0}^{M-1}\sum_{n=0}^{N-1} \tilde{G}^2(m,n) & \sum_{m=0}^{M-1}\sum_{n=0}^{N-1} \tilde{G}(m,n)\tilde{B}(m,n) \\ \sum_{m=0}^{M-1}\sum_{n=0}^{N-1} \tilde{G}(m,n)\tilde{B}(m,n) & \sum_{m=0}^{M-1}\sum_{n=0}^{N-1} \tilde{B}^2(m,n) \end{bmatrix} \begin{bmatrix} \alpha_R \\ \beta_R \end{bmatrix} = \begin{bmatrix} \sum_{m=0}^{M-1}\sum_{n=0}^{N-1} \tilde{R}(m,n)\tilde{G}(m,n) \\ \sum_{m=0}^{M-1}\sum_{n=0}^{N-1} \tilde{B}(m,n)\tilde{R}(m,n) \end{bmatrix}$ |
| | $\begin{bmatrix} \sum_{m=0}^{M-1}\sum_{n=0}^{N-1} \tilde{B}^2(m,n) & \sum_{m=0}^{M-1}\sum_{n=0}^{N-1} \tilde{B}(m,n)\tilde{R}(m,n) \\ \sum_{m=0}^{M-1}\sum_{n=0}^{N-1} \tilde{B}(m,n)\tilde{R}(m,n) & \sum_{m=0}^{M-1}\sum_{n=0}^{N-1} \tilde{R}^2(m,n) \end{bmatrix} \begin{bmatrix} \alpha_G \\ \beta_G \end{bmatrix} = \begin{bmatrix} \sum_{m=0}^{M-1}\sum_{n=0}^{N-1} \tilde{G}(m,n)\tilde{B}(m,n) \\ \sum_{m=0}^{M-1}\sum_{n=0}^{N-1} \tilde{R}(m,n)\tilde{G}(m,n) \end{bmatrix}$ |
| | $\begin{bmatrix} \sum_{m=0}^{M-1}\sum_{n=0}^{N-1} \tilde{R}^2(m,n) & \sum_{m=0}^{M-1}\sum_{n=0}^{N-1} \tilde{R}(m,n)\tilde{G}(m,n) \\ \sum_{m=0}^{M-1}\sum_{n=0}^{N-1} \tilde{R}(m,n)\tilde{G}(m,n) & \sum_{m=0}^{M-1}\sum_{n=0}^{N-1} \tilde{G}^2(m,n) \end{bmatrix} \begin{bmatrix} \alpha_B \\ \beta_B \end{bmatrix} = \begin{bmatrix} \sum_{m=0}^{M-1}\sum_{n=0}^{N-1} \tilde{B}(m,n)\tilde{R}(m,n) \\ \sum_{m=0}^{M-1}\sum_{n=0}^{N-1} \tilde{G}(m,n)\tilde{B}(m,n) \end{bmatrix}$ |

$\tilde{R}(m,n) = R(m,n) - \mu_R,\ \tilde{G}(m,n) = G(m,n) - \mu_G,\ \tilde{B}(m,n) = B(m,n) - \mu_B$

| | |
|---|---|
| Minimum Correlation | $\begin{bmatrix} \sum_{m=0}^{M-1}\sum_{n=0}^{N-1} RG & \sum_{m=0}^{M-1}\sum_{n=0}^{N-1} BR \\ \sum_{m=0}^{M-1}\sum_{n=0}^{N-1} [G^2 - GB] & \sum_{m=0}^{M-1}\sum_{n=0}^{N-1} [GB - B^2] \end{bmatrix} \begin{bmatrix} \alpha_R \\ \beta_R \end{bmatrix} = \begin{bmatrix} \sum_{m=0}^{M-1}\sum_{n=0}^{N-1} R^2 \\ \sum_{m=0}^{M-1}\sum_{n=0}^{N-1} [RG - BR] \end{bmatrix}$ |
| | $\begin{bmatrix} \sum_{m=0}^{M-1}\sum_{n=0}^{N-1} GB & \sum_{m=0}^{M-1}\sum_{n=0}^{N-1} RG \\ \sum_{m=0}^{M-1}\sum_{n=0}^{N-1} [B^2 - BR] & \sum_{m=0}^{M-1}\sum_{n=0}^{N-1} [BR - R^2] \end{bmatrix} \begin{bmatrix} \alpha_G \\ \beta_G \end{bmatrix} = \begin{bmatrix} \sum_{m=0}^{M-1}\sum_{n=0}^{N-1} G^2 \\ \sum_{m=0}^{M-1}\sum_{n=0}^{N-1} [GB - RG] \end{bmatrix}$ |
| | $\begin{bmatrix} \sum_{m=0}^{M-1}\sum_{n=0}^{N-1} BR & \sum_{m=0}^{M-1}\sum_{n=0}^{N-1} GB \\ \sum_{m=0}^{M-1}\sum_{n=0}^{N-1} [R^2 - RG] & \sum_{m=0}^{M-1}\sum_{n=0}^{N-1} [RG - G^2] \end{bmatrix} \begin{bmatrix} \alpha_B \\ \beta_B \end{bmatrix} = \begin{bmatrix} \sum_{m=0}^{M-1}\sum_{n=0}^{N-1} B^2 \\ \sum_{m=0}^{M-1}\sum_{n=0}^{N-1} [BR - GB] \end{bmatrix}$ |

TABLE 2-continued

Optimal Coefficients: Three-channel case

| Case | Optimal Coefficients |
|---|---|
| Minimum Covariance | $$\begin{bmatrix} \sum_{m=0}^{M-1}\sum_{n=0}^{N-1} \tilde{R}\tilde{G} & \sum_{m=0}^{M-1}\sum_{n=0}^{N-1} \tilde{B}\tilde{R} \\ \sum_{m=0}^{M-1}\sum_{n=0}^{N-1} [\tilde{G}^2 - \tilde{G}\tilde{B}] & \sum_{m=0}^{M-1}\sum_{n=0}^{N-1} [\tilde{G}\tilde{B} - \tilde{B}^2] \end{bmatrix} \begin{bmatrix} \alpha_R \\ \beta_R \end{bmatrix} = \begin{bmatrix} \sum_{m=0}^{M-1}\sum_{n=0}^{N-1} \tilde{R}^2 \\ \sum_{m=0}^{M-1}\sum_{n=0}^{N-1} [\tilde{R}\tilde{G} - \tilde{B}\tilde{R}] \end{bmatrix}$$ $$\begin{bmatrix} \sum_{m=0}^{M-1}\sum_{n=0}^{N-1} \tilde{G}\tilde{B} & \sum_{m=0}^{M-1}\sum_{n=0}^{N-1} \tilde{R}\tilde{G} \\ \sum_{m=0}^{M-1}\sum_{n=0}^{N-1} [\tilde{B}^2 - \tilde{B}\tilde{R}] & \sum_{m=0}^{M-1}\sum_{n=0}^{N-1} [\tilde{B}\tilde{R} - \tilde{R}^2] \end{bmatrix} \begin{bmatrix} \alpha_G \\ \beta_G \end{bmatrix} = \begin{bmatrix} \sum_{m=0}^{M-1}\sum_{n=0}^{N-1} \tilde{G}^2 \\ \sum_{m=0}^{M-1}\sum_{n=0}^{N-1} [\tilde{G}\tilde{B} - \tilde{R}\tilde{G}] \end{bmatrix}$$ $$\begin{bmatrix} \sum_{m=0}^{M-1}\sum_{n=0}^{N-1} \tilde{B}\tilde{R} & \sum_{m=0}^{M-1}\sum_{n=0}^{N-1} \tilde{G}\tilde{B} \\ \sum_{m=0}^{M-1}\sum_{n=0}^{N-1} [\tilde{R}^2 - \tilde{R}\tilde{G}] & \sum_{m=0}^{M-1}\sum_{n=0}^{N-1} [\tilde{R}\tilde{G} - \tilde{G}^2] \end{bmatrix} \begin{bmatrix} \alpha_B \\ \beta_B \end{bmatrix} = \begin{bmatrix} \sum_{m=0}^{M-1}\sum_{n=0}^{N-1} \tilde{B}^2 \\ \sum_{m=0}^{M-1}\sum_{n=0}^{N-1} [\tilde{B}\tilde{R} - \tilde{G}\tilde{B}] \end{bmatrix}$$ |

$\tilde{R}(m, n) = R(m, n) - \mu_R$, $\tilde{G}(m, n) = G(m, n) - \mu_G$, $\tilde{B}(m, n) = B(m, n) - \mu_B$ In suboptimal processing there is no cost function involved, the coefficient value is chosen on an ad hoc basis and the resulting mean square error or error variance is not necessarily the minimum. Further, only two components are used in the differencing process.

The difference images are obtained by selecting the weights as the ratio of the mean values of the respective image components involved, as given by:

$$e_R(m, n) = R(m, n) - \alpha_R G(m, n); \alpha_R = \frac{\mu_R}{\mu_G} \quad \text{Equation 42}$$

$$e_G(m, n) = G(m, n) - \alpha_G B(m, n); \alpha_G = \frac{\mu_G}{\mu_B} \quad \text{Equation 43}$$

$$e_B(m, n) = B(m, n) - \alpha_B R(m, n); \alpha_B = \frac{\mu_B}{\mu_R} \quad \text{Equation 44}$$

In, the coefficients are chosen as the ratio of the standard deviations of the component images and the weights are given by:

$$\alpha_R = \frac{\sigma_R}{\sigma_G}; \alpha_G = \frac{\sigma_G}{\sigma_B}; \alpha_B = \frac{\sigma_B}{\sigma_R} \quad \text{Equation 45}$$

For a third case we choose the ratio of the maximum component values as the coefficient values. Thus, $$\alpha_R = \frac{\max(R(m, n))}{\max(G(m, n))}; \quad \text{Equation 46}$$

$$\alpha_G = \frac{\max(G(m, n))}{\max(B(m, n))};$$

-continued $$\alpha_B = \frac{\max(B(m, n))}{\max(R(m, n))}$$

The image may be processed in whole or in sub-blocks. The pre-detection processing methods just described can be applied to the whole image or they can be applied to sub-blocks of an image. Images in general and video sequence images in particular, are non-stationary. This implies that the statistics change over regions within an image. To exploit non-stationary of images, it is advantageous to apply the pre-detection processing methods to subimages. As shown in FIG. 1, one can process sub-blocks of fixed size or variable size or one row at a time. In processing sub-blocks of varying size, one has to adopt a suitable criterion for choosing sub-block size. This is described in the next subsection.

Figure 2:
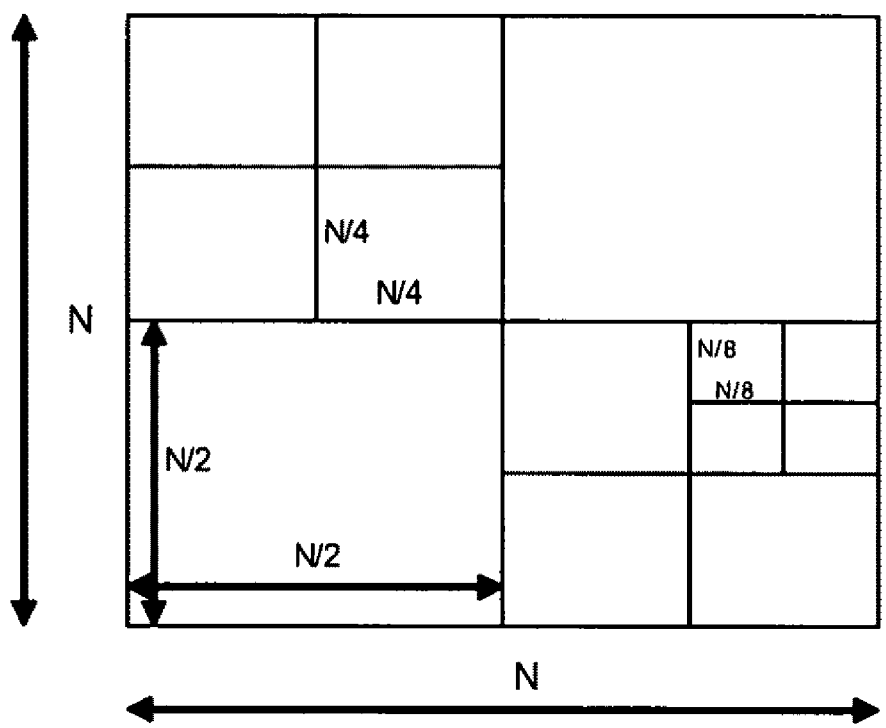
FIG. 2 is a diagram of a quad-tree decomposition of a whole image.

Quad-tree decomposition is an efficient procedure to decompose an image into sub-blocks. The only requirement is that the image height and width be integer powers of 2. In this procedure one starts with a given image as the root node of a tree and a suitable metric for the whole image is calculated. Next the metrics for the four sub-blocks, each of size $\frac{1}{4}^{th}$ the size of the whole image are computed. A decision is made to split each sub-block sequentially depending on whether that sub-block metric is greater than the metric of its parent node. This process is continued until the specified sub-block size is reached. The minimum number of sub-blocks is 4. FIG. 2 shows a typical quad-tree structure.

The contrast of the processed component images can be improved by contrast stretching. The contrast regions are automatically selected using the image statistics such as the image histogram.

Once the images are processed we need to draw the boundaries of the targets present in the scene for further data collection such as target classification. This involves first smoothing of the processed images. Smoothing generally tends to blur the image. Hence we use special, non-blurring filtering such as the diffusion filtering to smooth the processed images. Next an edge detection processing method, typically Canny's method, is used followed by morphological processing to calculate properties of the object boundaries.

The acquired raw images usually contain a number of pixels that are saturated. These may occur as isolated single pixels or as clusters of pixels scattered over the image. These clusters of saturated pixels are known as glints. The presence of glints reduces the contrast of areas of interest, especially if the glints occupy a sizeable fraction of the image area. Moreover, glints dominate the statistical quantities of interest due to their very large values. Therefore, images must be preprocessed to remove the presence of glints. Preprocessing is also necessary to reduce image noise. In addition to glints the glare or surface illumination, which is due to the illumination source must be reduced.

Preprocessing images in the wavelet domain is effective in removing glints and noise from the images. It also has the advantage of computational savings. Specifically, applications of two-dimensional Discrete Wavelet Transform (DWT) once to the image decomposes it into one approximation and three detail coefficients, each $\frac{1}{4}^{th}$ the size of the original image. It has been found that biorthogonal wavelet performs better than orthogonal wavelet. The approximation coefficients contain the information in the original image at a lower resolution. Hence glint removal operation is performed on the approximation coefficients. As pointed out, since the approximation component of the DWT coefficients is only $\frac{1}{4}^{th}$ the size of the original image, computational saving is achieved. As the detail coefficients carry edge information in the original image at lower resolutions, image denoising (a term used to imply the removal of noise) is effected in these components. Once glint removal and denoising operations are performed, the image is reconstructed by applying inverse 2D DWT (IDWT) to the DWT coefficients.

The detail components of the 2D DWT of each channel image contain edge information as well as noise. Noise coefficients have amplitudes according to a Laplacian distribution and are usually large while edges have smaller amplitudes. Thus noise is reduced by thresholding the detail coefficients in the wavelet domain. These thresholds are determined based on the statistics of the detail coefficients.

Glints are specular reflections of the light source by the surface being imaged. Therefore, glints produce highly saturated pixels in all the channels whose size depend on various properties of the reflecting surface and it is random. Consequently, the approximation coefficients of the 2D DWT must be inspected. In one approach, glints may be removed or reduced using morphological processing to determine the boundaries of the glint regions, which in turn are determined by hard or soft thresholding. The thresholds are determined from the statistics of the approximation coefficients of the 2D DWT. Thresholding can be performed on each channel or on the dominant channel. Thresholding yields a binary image from which the boundaries of the glints are calculated. Glint regions are eliminated by replacing them with corresponding mean values in all the channels.

The surface and target reflections appear as multiplicative components in the acquired images. In order to selectively filter out the surface reflection from that of the target, image filtering may be performed in the log domain, as logarithm of product of signals equals sum of signal components. This type of filtering is called homomorphic filtering. Since the surface reflection is a lowpass signal while the target reflection is highpass, these two components can be selectively reduced using a suitable homomorphic filter. Thus, a homomorphic filter is a band-pass filter. After homomorphic filtering, the resulting image is smoothed and the pixels are exponentiated to obtain images in the pixel domain.

EXAMPLES

Example 1

Figure 3:
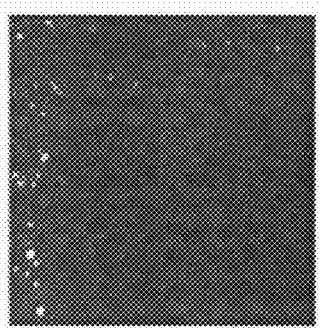
FIG. 3 (A) is an example of the combined intensity values of a captured image; (B) is the intensity values of the red array of the capture image in (A); (C) is the intensity values of the green array of the capture image in (A); and (D) is the intensity values of the blue array of the capture image in (A).
Figure 3:
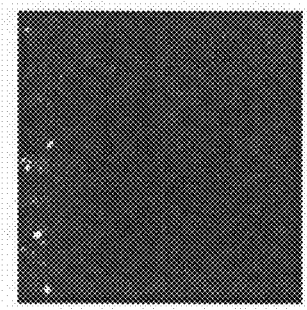
Figure 3:
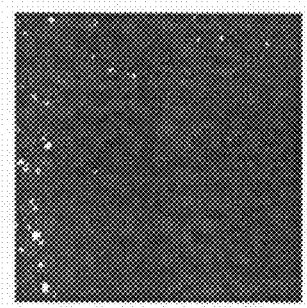
Figure 3:
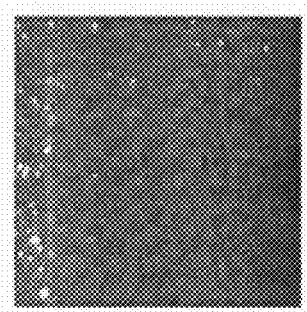

Capturing and Processing an Image to Identify Object Below the Surface of the Water A. Acquiring an Image A 24-inch diameter disc was submerged under the surface of the water at a depth of approximately 23 feet. An image is obtained of a desired area of water using C0610004 digital camera (Micro USA, Poway, Calif.), that captures the image as intensity values in the separate red, green and blue spectral regions. These data sets are stored in a portable Personal Computer as data points. FIG. 3A shows a photo of the combined spectral regions and FIGS. 3B-D show photos of the separate spectral regions for red, green and blue.

B. Converting Raw Data into Arrays

The raw data intensity values obtained in A above for the red, green and blue spectral regions are processed into arrays. The raw intensity values obtained in A above for the red, green and blue spectral regions are transferred from the camera storage buffer into the computer memory, one for each of the red, green and blue arrays. A variety of software is available that can perform this function, in this example LabView software (National Instruments Corp., Austin, Tex.) was utilized to transfer the data. For example, the red array transferred to the computer memory is labeled R, the green array G and the blue array B. Each numerical value in each array in the computer memory is called a pixel or picture element and its numerical value can have 3, 4 or 5 decimal digits (e.g. the maximum value can vary from 255 to 65531). A pixel in the red array can be located by its row and column address as R(m,n), where m refers to the row and n to the column. Similarly, G(m,n) refers to the pixel in the green array with row address m and column address n. In a similar fashion, B(m,n) denotes a pixel in the blue array with row address m and column address n.

C. Converting Data Arrays into 2-Dimensional Discrete Wavelet Transform Arrays (2-D DWT Arrays).

Data arrays in the red, green and blue spectral regions may be converted into 2-D DWT arrays in two steps. For example, assume that the number of rows is M and number of columns N for the red array. In the first step each row of the red array is transformed into a corresponding row of DWT coefficients retaining every other point as given in Equations 1a and 1b obtaining two intermediate arrays of size M rows and N/2 columns:

$$W_\phi(m, k) = \frac{1}{\sqrt{N}} \sum_{n=0}^{N-1} R[m, n]\phi_{j,k}[n] \tag{1a}$$

$$W_\psi(m, k) = \frac{1}{\sqrt{N}} \sum_{n=0}^{N-1} x[n]\Psi_{m,k}[n] \tag{1b}$$

In the second step, each of the arrays in (1a) and (1b) is again considered sequentially one column at a time and the corresponding DWT coefficients are computed retaining every other point as given in (2a), (2b), (2c) and (2d) obtaining a total of four arrays LL, LH, HL and HH of size each M/2 rows and N/2 columns:

$$W_{LL}(j,k) = \frac{1}{\sqrt{M}} \sum_{m=0}^{M-1} W_\varphi[m,k]\phi_{j,k}[m] \quad (2a)$$

$$W_{LH}(j,k) = \frac{1}{\sqrt{M}} \sum_{m=0}^{M-1} W_\phi[m,k]\psi_{j,k}[m] \quad (2b)$$

$$W_{HLL}(j,k) = \frac{1}{\sqrt{M}} \sum_{m=0}^{M-1} W_\psi[m,k]\phi_{j,k}[m] \quad (2c)$$

$$W_{HHL}(j,k) = \frac{1}{\sqrt{M}} \sum_{m=0}^{M-1} W_\psi[m,k]\psi_{j,k}[m] \quad (2d)$$

Figure 4:
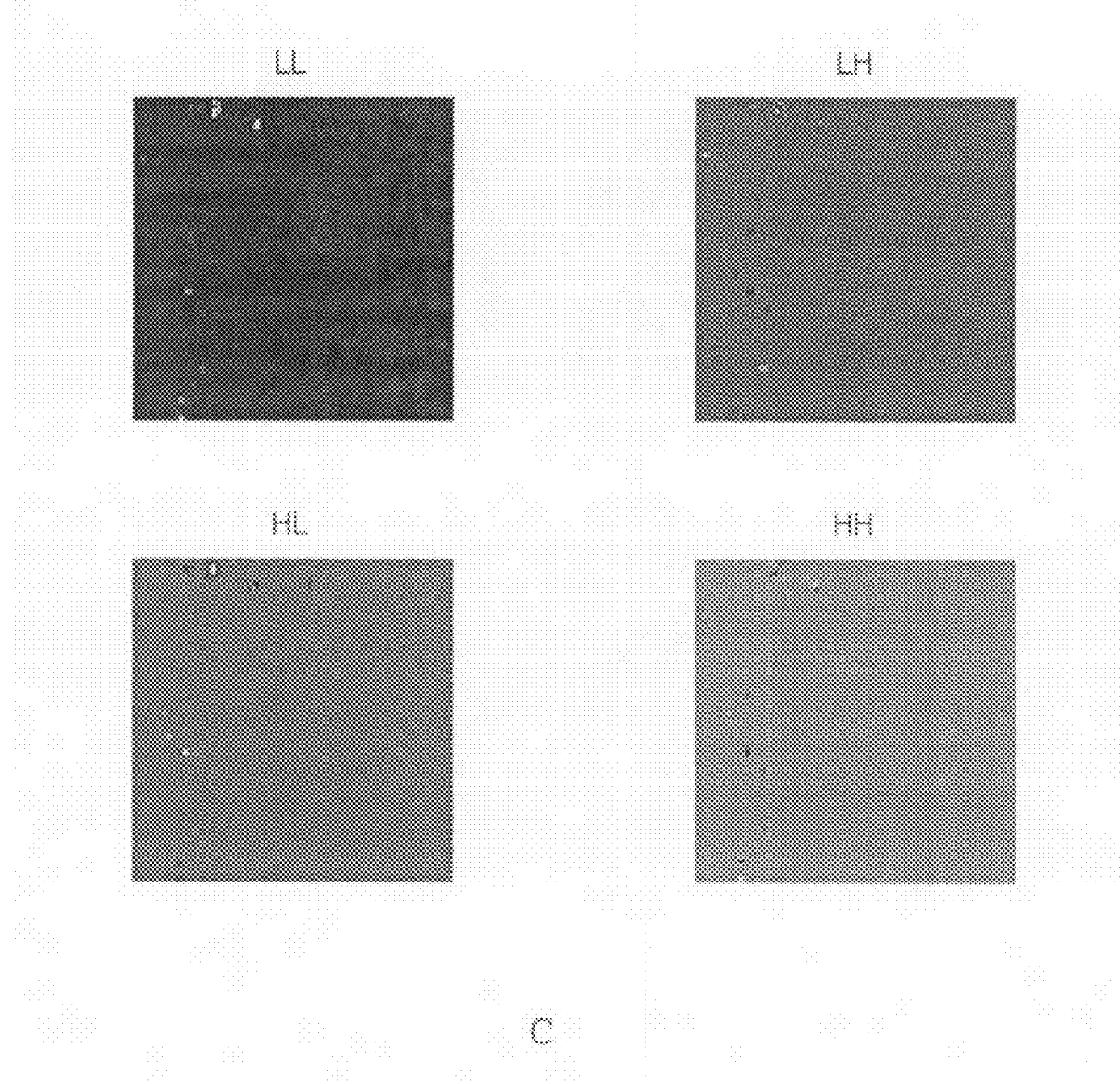
FIG. 4 (A) is the 2-dimensional discrete wavelet transform coefficient arrays for the combined spectral regions for the captured image in FIG. 3; (B) is the 2-D DWT coefficient array corresponding to the red array of the 2-D DWT coefficient arrays in (A); (C) is the 2-D DWT coefficient array corresponding to the green array of the 2-D DWT coefficient arrays in (A); and (D) is the 2-D DWT coefficient array corresponding to the blue array of the 2-D DWT coefficient arrays in (A).
Figure 4:
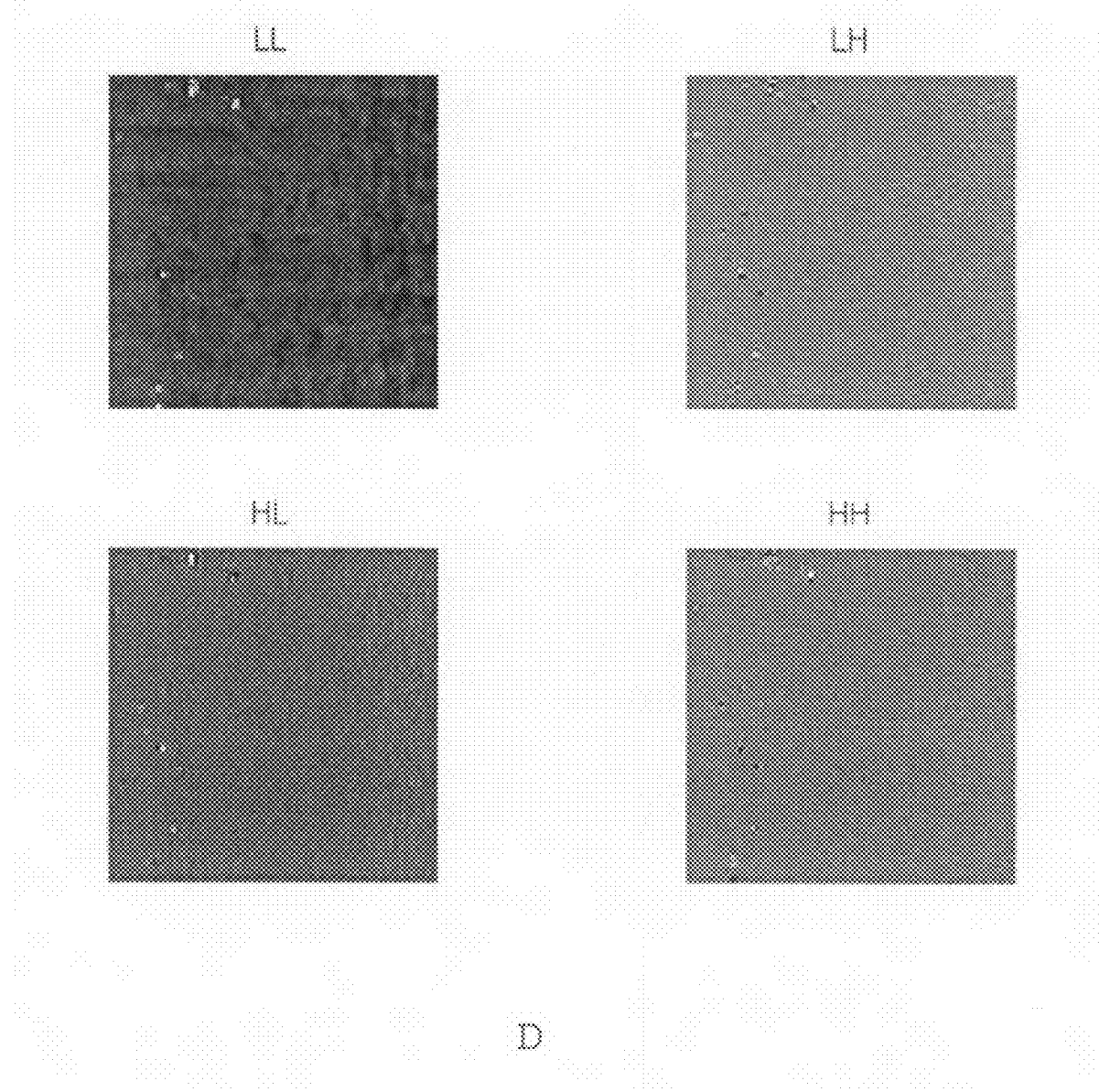

This process is repeated on the green and blue arrays obtaining corresponding 2D DWT coefficient arrays similar to the red DWT coefficients. FIG. 4A shows a photo of the 2-D DWT arrays for the combined spectral regions and FIGS. 4B-D show photos of the separate 2-D DWT arrays for the spectral regions red, green and blue. These 2D DWT coefficients of the component images actually consist of four subarrays named LL, LH, HL and HH as shown, for example, in FIG. 4B. Though these subarrays of DWT coefficients are shown as four separate image arrays for visualization purpose, they are stored in the computer memory as a contiguous array of coefficients in that order.

D. Removing Glints and Electronic Noise.

The 2-D DWT array coefficients are examined one array at a time. For each subarray of DWT coefficients, the standard deviation is computed first as given by Equations (2e) and (2f):

$$\mu_{LL} = \frac{1}{MN} \sum_{i=0}^{M-1} \sum_{j=0}^{N-1} W_{LL}(i,j) \quad (2e)$$

$$\sigma_{LL} = \sqrt{\frac{1}{MN} \sum_{i=1}^{M-1} \sum_{j=0}^{N-1} (W_{LL}(i,j) - \mu_{LL})^2} \quad (2f)$$

Equations (2e) and (2f) are repeated using the DWT coefficient values corresponding to LH, HL and HH subarrays. The same procedure is used for the green and blue DWT coefficient arrays. For example, if a DWT coefficient value in the LL component of the red DWT coefficient array exceeds a value equal to three times the standard deviation of the LL coefficient array, then that coefficient value is replaced by a value equal to the average of coefficients within a 3×3 neighborhood of the coefficient being considered. This is repeated until all coefficients in the red LL DWT coefficient array are considered. The procedure is repeated for the green and blue arrays sequentially.

Data arrays are restored following glint and electronic noise reduction by performing a 2D-inverse DWT. For example, the 2D inverse DWT (IDWT) of the red coefficient array can be computed in two steps. In the first step each row of the red DWT coefficient array is doubled in size by inserting zero values between every pair of coefficients and then inverse transforming into a corresponding row of pixels as given in Equations 3a obtaining an intermediate array of size M/2 rows and N columns:

$$\tilde{R}(j,n) = \frac{1}{\sqrt{N}} \sum_{k=0}^{N-1} W_{LL}[j,k]\phi_{j,k}[n] + \frac{1}{\sqrt{N}} \sum_{k=0}^{N-1} W_{LH}[j,k]\psi_{j,k}[n] + \frac{1}{\sqrt{N}} \sum_{k=0}^{N-1} W_{HL}[j,k]\psi_{j,k}[n] + \frac{1}{\sqrt{N}} \sum_{k=0}^{N-1} W_{HH}[j,k]\psi_{j,k}[n] \quad (3a)$$

In the second step, the array in (3a) is again considered sequentially one column at a time, first doubling the number of rows to M by inserting zero values between every pair of DWT coefficients and then computing the IDWT, thus obtaining the corresponding pixels in the glint removed red array of size each M rows and N columns as given in (3b):

$$\tilde{R}(m,n) = \frac{1}{\sqrt{M}} \sum_{j=0}^{M-1} \tilde{R}(j,n)\phi_{j,k}[m] + \frac{1}{\sqrt{M}} \sum_{j=0}^{M-1} \tilde{R}(j,n)\psi_{j,k}[m] + \frac{1}{\sqrt{M}} \sum_{j=0}^{M-1} \tilde{R}(j,m)\psi_{j,k}[m] + \frac{1}{\sqrt{M}} \sum_{j=00}^{M-1} \tilde{R}(j,m)\psi_{j,k}[m] \quad (3b)$$

Figure 5:
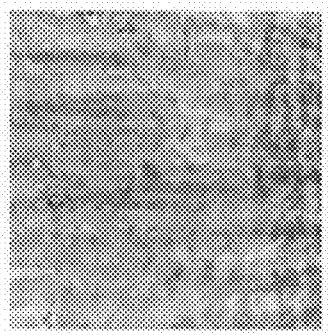
FIG. 5 (A) is the inverse discrete wavelet transform of the combined spectral regions for the captured image in FIG. 4; (B) is the inverse DWT for the red region image component of the inverse DWT in (A); (C) is the inverse DWT for the green region image component of the inverse DWT in (A); and (D) is the inverse DWT for the blue region image component of the inverse DWT in (A).
Figure 5:
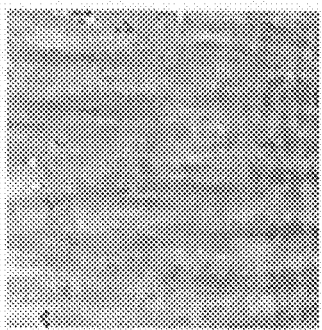
Figure 5:
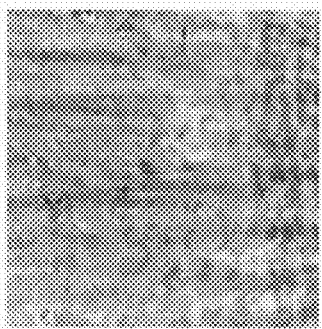
Figure 5:
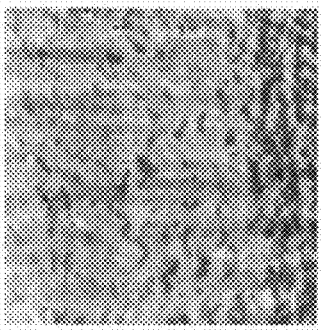

This process is repeated on the green and blue arrays obtaining corresponding modified pixel arrays similar to the red IDWT calculations. FIG. 5A shows a photo of the 2-D inverse DWT arrays for the combined spectral regions and FIGS. 5B-D show photos of these separate 2-D inverse DWT arrays for the spectral regions red, green and blue.

E. Removal of Overall Surface Reflection.

The process used to remove the overall surface reflection requires that the logarithm of the data obtained in F be calculated, that this data be filtered and restoring the data by computing the inverse logarithm of the filtered images in the pixel domain. For the sake of illustration, assume the red pixel array after glint removal from step D to be R(m,n). Logarithm of this array is computed by computing the logarithm of each pixel using the logarithm math function built into the computer yielding equation (4a):

$$R_1(m,n) = \ln(R(m,n)+1) \quad (4a)$$

In equation (4a), the pixel values are greater than or equal to zero. The logarithm array obtained as in equation (4a) is filtered by a filter whose impulse response is denoted h(m,n), resulting in a filtered array $R_2(m,n)$ as given by (4b):

$$R_2(m,n) = \sum_{r=0}^{M-1} \sum_{c=0}^{N-1} R_1(m-r, n-c)h(r,c) \quad (4b)$$

The filtered pixel array $R_2(m,n)$ is then exponentiated obtaining a red image with surface reflections removed as given by equation (4c):

$$R_3(m,n) = \exp(R_2(m,n)) - 1 \quad (4c)$$

Figure 6:
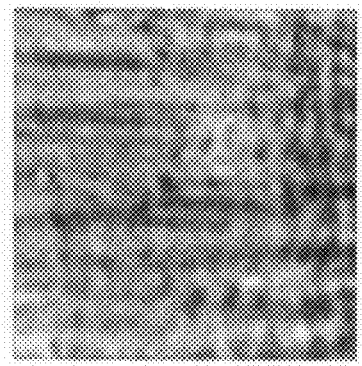
FIG. 6 (A) is the combined spectral regions after removal of surface reflection from the captured image in FIG. 5; (B) is the red region image component of (A); (C) is the green region image component of (A); and (D) is the blue region component of (A).
Figure 6:
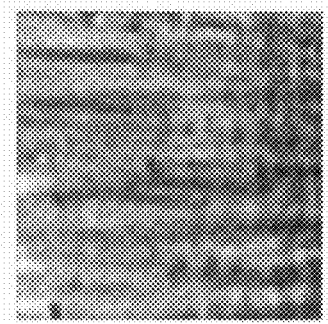
Figure 6:
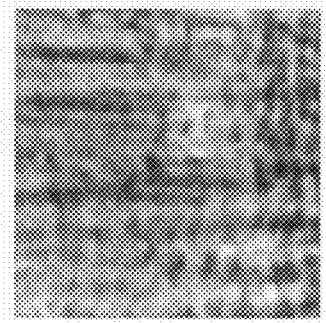
Figure 6:
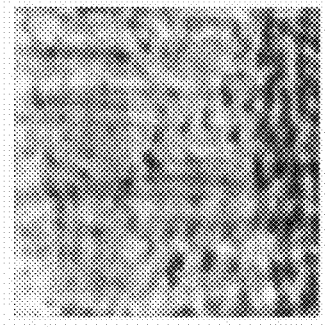

FIG. 6A shows a photo of the data for the combined spectral regions and FIGS. 6B-D show photos of the separate data for the spectral regions red, green and blue following removal of overall surface reflection.

F. Computing the Optimal Multiplication Coefficient $\alpha_R$ $\alpha_G$ and $\alpha_B$.

Figure 7:
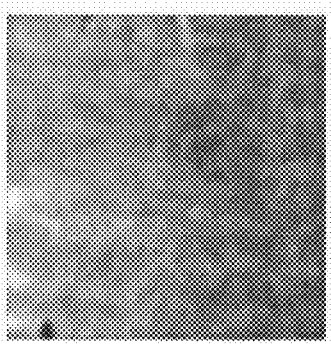
FIG. 7 (A) is the spectral difference image of FIG. 6(B) and FIG. 6(C); (B) is the spectral difference image of FIG. 6(C) and FIG. 6(D); (C) is the spectral difference image of FIG. 6(D) and FIG. 6(B); and (D) is a pseudo color image of the target.
Figure 7:
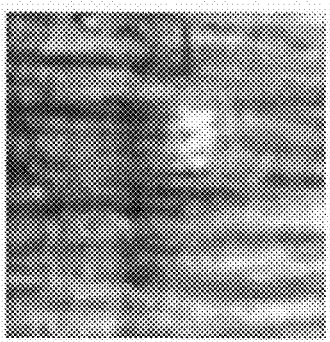
Figure 7:
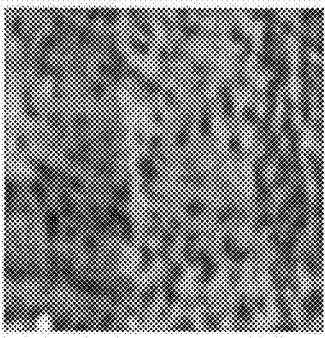
Figure 7:
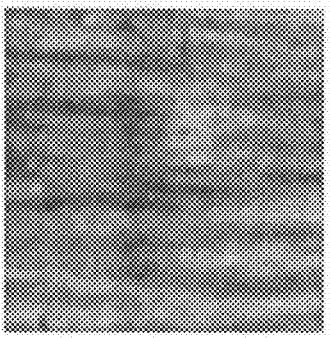

The optimal multiplication coefficient $\alpha_R$ in equation (1) to form the red-green difference image is calculated as follows:

$$e_R(m,n)$$

$$e_R(m,n) = R(m,n) - \alpha_R G(m,n) \quad (1)$$

minimizing the Mean Square Error, $$\varepsilon_R = \frac{1}{MN} \sum_{m=0}^{M-1} \sum_{n=0}^{N-1} e_R^2(m, n),$$

where M is the number of rows and N is the number of columns of the image producing the image of the object below the surface as shown in FIG. 7A, The optimal multiplication coefficient $\alpha_G$ in equation (2) to form the green-blue difference image is calculated as follows:

$e_G(m,n)$ $$e_G(m,n) = G(m,n) - \alpha_G B(m,n) \quad (2)$$

minimizing the Mean Square Error, $$\varepsilon_G = \frac{1}{MN} \sum_{m=0}^{M-1} \sum_{n=0}^{N-1} e_G^2(m, n),$$

where M is the number of rows and N is the number of columns of the image producing the image of the object below the surface as shown in FIG. 7B, The optimal multiplication coefficient $\alpha_B$ in equation (3) to form the blue-red difference image is calculated as follows:

$e_B(m,n)$ $$e_B(m,n) = B(m,n) - \alpha_B R(m,n) \quad (3)$$

minimizing the Mean Square Error, $$\varepsilon_B = \frac{1}{MN} \sum_{m=0}^{M-1} \sum_{n=0}^{N-1} e_B^2(m, n),$$

where M is the number of rows and N is the number of columns of the image producing the image of the object below the surface as shown in FIG. 7C. Combining the difference images, $e_R(m,n)$, $e_G(m,n)$ and $e_B(m,n)$ to obtain a pseudo color image of the object below the surface for a better visual appearance as shown in FIG. 7D. The object of interest may be visualized in one or more of the difference channels, in our illustration the object is visible in FIG. 7B.

We claim:

1. A processing method to increase the detection of objects below the surface of the water comprising the steps of:
    A. acquiring image data in separate spectral regions simultaneously and converting the image data into intensity value arrays for each spectral region,
    B. transforming the intensity value arrays into two-dimensional discrete wavelet transform arrays for each spectral region, and
    C. subtracting in a pair wise manner the two-dimensional discrete wavelet transform arrays thereby obtaining images showing an object below the surface of the water.

2. A processing method according to claim 1 wherein said spectral regions are red, green and blue.

3. A processing method according to claim 1 wherein said subtracting in a pairwise manner comprises subtracting the red array data from green array data, green array data from blue array data and blue array data from red array data.

4. A processing method to increase the detection of objects below the surface of the water comprising the steps of:
    A. acquiring image data in separate spectral regions simultaneously and converting the image data into intensity value arrays for each spectral region,
    B. transforming the intensity value arrays into two-dimensional discrete wavelet transform arrays for each spectral region,
    C. removing or reducing glints and electronic noise from the two-dimensional discrete wavelet transform arrays for each spectral region to produce a first modified array data set for each spectral region, and
    D. subtracting in a pair wise manner first modified array data sets thereby obtaining images showing an object below the surface of the water.

5. A processing method according to claim 4 wherein said spectral regions are red, green and blue.

6. A processing method according to claim 4 wherein said subtracting in a pairwise manner comprises subtracting the red array data from green array data, green array data from blue array data and blue array data from red array data.

7. A processing method to increase the detection of objects below the surface of the water comprising the steps of:
    A. acquiring image data in separate spectral regions simultaneously and converting the image data into intensity value arrays for each spectral region,
    B. transforming the intensity value arrays into two-dimensional discrete wavelet transform arrays for each spectral region,
    C. eliminating or reducing surface reflection from the two-dimensional discrete wavelet transform arrays to produce a second modified array data set for each spectral region, and
    D. subtracting in a pair wise manner second modified array data sets thereby obtaining images showing an object below the surface of the water.

8. A processing method according to claim 7 wherein said spectral regions are red, green and blue.

9. A processing method according to claim 7 wherein said subtracting in a pairwise manner comprises subtracting the red array data from green array data, green array data from blue array data and blue array data from red array data.

10. A processing method to increase the detection of objects below the surface of the water comprising the steps of:
    A. acquiring image data in separate spectral regions simultaneously and converting the image data into intensity value arrays for each spectral region,
    B. transforming the intensity value arrays into two-dimensional discrete wavelet transform arrays for each spectral region,
    C. removing or reducing glints and electronic noise from the two-dimensional discrete wavelet transform arrays for each spectral region to produce a first modified array data set for each spectral region,
    D. eliminating or reducing surface reflection from first modified array data set to produce a second modified array data set for each spectral region, and
    E. subtracting in a pairwise manner second modified array data sets thereby obtaining images showing an object below the surface of the water.

11. A processing method according to claim 10 wherein said spectral regions are red, green and blue.

12. A processing method according to claim 10 wherein said subtracting in a pairwise manner comprises subtracting the red array data from green array data, green array data from blue array data and blue array data from red array data.

* * * * *